(12) United States Patent
Gorzela et al.

(10) Patent No.: US 8,935,323 B2
(45) Date of Patent: Jan. 13, 2015

(54) BLOG INTEGRATION IN A COLLABORATIVE SYSTEM

(75) Inventors: Richard Gorzela, Andover, MA (US); Stephen J. Foley, Quincy, MA (US)

(73) Assignee: International Business Machines Corporation, Armonk, NY (US)

( * ) Notice: Subject to any disclaimer, the term of this patent is extended or adjusted under 35 U.S.C. 154(b) by 1489 days.

(21) Appl. No.: 11/070,765

(22) Filed: Mar. 2, 2005

(65) Prior Publication Data

US 2006/0200483 A1    Sep. 7, 2006

(51) Int. Cl.
| | |
|---|---|
| G06F 15/16 | (2006.01) |
| G06F 15/173 | (2006.01) |
| G06Q 10/00 | (2012.01) |
| H04L 12/18 | (2006.01) |
| G06F 17/30 | (2006.01) |

(52) U.S. Cl.
CPC ............ *G06Q 10/00* (2013.01); *H04L 12/1813* (2013.01); *G06F 17/3089* (2013.01)
USPC .......................................... 709/204; 709/205

(58) Field of Classification Search
CPC ........................ H04L 12/1813; G06F 17/3089
USPC ......... 709/204, 205, 207, 220, 221, 223, 224, 709/225, 227
See application file for complete search history.

(56) References Cited

U.S. PATENT DOCUMENTS

| | | | |
|---|---|---|---|
| 6,334,141 B1 | 12/2001 | Varma et al. | |
| 6,378,001 B1* | 4/2002 | Aditham et al. | 719/313 |
| 6,766,356 B1* | 7/2004 | Krautter | 709/204 |
| 7,143,357 B1* | 11/2006 | Snibbe et al. | 715/751 |
| 2002/0156808 A1* | 10/2002 | Duffy et al. | 707/505 |
| 2004/0143630 A1* | 7/2004 | Kaufmann et al. | 709/205 |
| 2005/0160396 A1* | 7/2005 | Chadzynski | 717/103 |
| 2005/0204297 A1* | 9/2005 | Banatwala et al. | 715/753 |
| 2005/0273503 A1* | 12/2005 | Carr et al. | 709/219 |
| 2006/0031332 A1* | 2/2006 | Brownholtz et al. | 709/206 |
| 2006/0053194 A1* | 3/2006 | Schneider et al. | 709/204 |
| 2006/0095507 A1* | 5/2006 | Watson | 709/203 |

FOREIGN PATENT DOCUMENTS

| | | |
|---|---|---|
| KR | 2003036379 A | 3/2003 |
| KR | 2003094151 | 10/2003 |

OTHER PUBLICATIONS

Vaughan-Nichols, Steven J., Presence Technology: More Than Just Instant Messaging, Industry Trends, Oct. 2003, pp. 11-13.
Becker, David, Blogs Open Doors for Developers, Cnet.com, Jan. 31, 2003.

* cited by examiner

*Primary Examiner* — Aaron Strange
(74) *Attorney, Agent, or Firm* — Steven M. Greenberg, Esq.; CRGO Law

(57) ABSTRACT

A method, system and apparatus for an integrated blog in a collaborative environment. In this regard, the collaborative environment can include a named collaborative space and one or more collaborative components disposed in the named collaborative space. For instance, the collaborative components can include a discussion forum, a persistent chat, a shared calendar and a shared document library, to name a few. Importantly, a blogging application can be disposed in the named collaborative space as one of the collaborative components. To that end, the blogging application can be coupled to a collaborative blog internal to the collaborative environment.

5 Claims, 2 Drawing Sheets

BLOG INTEGRATION IN A COLLABORATIVE SYSTEM

BACKGROUND OF THE INVENTION

1. Statement of the Technical Field

The present invention relates to a Web log and more particularly to the incorporation of a Web log in a collaborative system.

2. Description of the Related Art

A "Blog" can be defined as a regularly updated Web log. The prototypical blog can include information relating to a specific topic. For instance, in many cases a blog has been used as a daily diary regarding the personal life of the author, the political views of the author, or a social commentary reflecting the viewpoint of the author. The roots of "blogging" can be traced to the mid-1990's. Still, the identity of the first blogger remains unclear, as the art of blogging did not really take hold until the year 1999. Nevertheless, the original "weblogs" could be characterized as link-driven Web sites containing the personal commentaries of one or more authors. While initially thought of as diaries or online journals, the inviting nature of blogs have caused blogs to evolve into a source of fresh Web content for many interested Web surfers.

Today, blogging represents an emerging collaboration technology that greatly simplifies the sharing of ideas and thoughts in a communal environment. Specifically, blogging can simplify the posting of Web content by automating the publishing of Web log content. To that end, blogs provide a means for an individual or group to maintain a Web site where posting new content is accomplished via a Web browser allowing content to be aggregated easily. In many circumstances, blog posts can be complimented with commentary from the original poster as well by others who visit the blog.

Much of the explosion of web-based commentary via blogging has been fueled by the addition of "Really Simple Syndication" (RSS) publishing features in blogging applications. RSS technology allows blog site aggregators to be updated with RSS feeds from related blog sites, or other sources of information. Specifically, RSS is an XML-based format that allows the syndication of content ranging from lists of hyperlinks to blog postings. To enable the syndication of content, a Web site can publish an RSS feed, or channel. Once a feed becomes available, content browsers can regularly fetch the RSS feed to receive the most recently published content in the channel. It is to be noted that additional, alternative technologies to RSS have been developed including the Atom technology.

Blogs have proven to be useful in the corporate enterprise environment as blogs can provide a means to share information. Yet, alone blogs can be deficient in many respects which can limit the applicability and usefulness of blogs in a corporate collaborative environment. For instance, security is lacking in that a blog generally can be accessed by anyone having knowledge of the network address of the blog. Also, users cannot initiate a search of the blog within a specific collaborative context from a single point of access in order to locate content of interest. Furthermore, users of the blog remain "unaware" of blog authors of blog postings. Users yet further cannot enjoy a convenient method for referencing internal sources within a blog post. Finally, neither users nor groups have a single point to control access to the blog in relation to other collaborative elements such as discussion forums and documents.

SUMMARY OF THE INVENTION

The present invention addresses the deficiencies of the art in respect to blogging and provides a novel and non-obvious method, system and apparatus for an integrated blog in a collaborative environment. In this regard, the collaborative environment can include one or more named collaborative spaces and one or more collaborative components disposed in the named collaborative space. For instance, the collaborative components can include a discussion forum, a persistent chat, a shared calendar and a shared document library, to name a few.

Importantly, a blogging application, which can include one or more blogs, can be disposed in the named collaborative space as a collaborative component on equal footing with the other collaborative components. To that end, the blogging application can be coupled to a collaborative blog disposed internally within the collaborative environment. In a particular aspect of the invention, the collaborative environment can include a feed utility disposed in the collaborative environment and configured to export blog feeds to internal or external aggregators known as feed readers. As an example, the feed reader can be an RSS feed reader and the feed utility can be an RSS feed utility although other alternative technologies to RSS can suffice.

Notably, a user interface search element can be configured in the collaborative environment to search for content across the collaborative components in the collaborative environment. Moreover, the collaborative environment can be configured with awareness logic for the blogging application including the blog components as the awareness logic also can be applied to the other collaborative components. Finally, the collaborative environment can be configured to process single sign-on logic for members of the collaborative environment which also allows a user who has access to a collaborative space to also have access to the contained blog components.

A method for integrating a blogging application in a collaborative environment can include processing a single sign-on for a member of the collaborative environment and loading one or more collaborative components into a collaborative space associated with the member. Importantly, the collaborative components can include at least one blogging application including a feed reader. Specifically, the importing step can include importing feeds are internal to the collaborative environment, and also from feeds which are external to the collaborative environment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for integrating a blogging application in a collaborative environment. In accordance with the present invention, a collaborative environment can be configured with one or more collaborative spaces such as a named collaborative space, each having one or more applications. Each collaborative space can include combinations of collaborative technologies arranged to provide a means for members of a collaborative community to pool strengths and experiences to achieve a common goal. For instance, a common goal can include an educational objective, the completion of a software development project or even the creation and use of a system to manage human resources.

The collaborative space generally can be defined by (1) a particular context, i.e. the objective of the collaborative space, (2) membership, i.e., the participants in the collaborative space, (3) a set of roles for the members, and (4) resources and tools which can be accessed by the membership in furtherance of the objective of the collaborative space. Notably, the roles are names given to the people in the collaborative space which dictate access to the resources and tools within the collaborative space as well as define the behavior of the community members. The resources and tools, by comparison, include collaborative applications useful in achieving the collaborative objective of the membership.

In accordance with the present invention, at least one of the collaborative applications can include a collaborative blog feed reader which can be configured to render one or more feeds from an internal source such as an internal collaborative blog or external blog. Additionally a feed utility exists in the collaborative space so that the postings from the collaborative blogs can be made available to external aggregators (feed readers) as well as internal aggregators.

Importantly, by integrating the blog component, and the blog feed reader within the collaborative environment, the blog application can enjoy many of the inherent advantages of the collaborative environment. Those advantages include the limitation or restriction of access to the blogging application according to the role of the accessing user. Those advantages further can include a single point of access to a searching operation for content in the blog and other collaborative applications. Those advantages yet further can include the incorporation of awareness in the blogging application for content providers to one or more blogs accessed in the collaborative environment. Thus, the membership of the collaborative space can access both internal and external blog feeds from within the collaborative space without suffering the deficiencies of a stand-alone blog.

Figure 1:
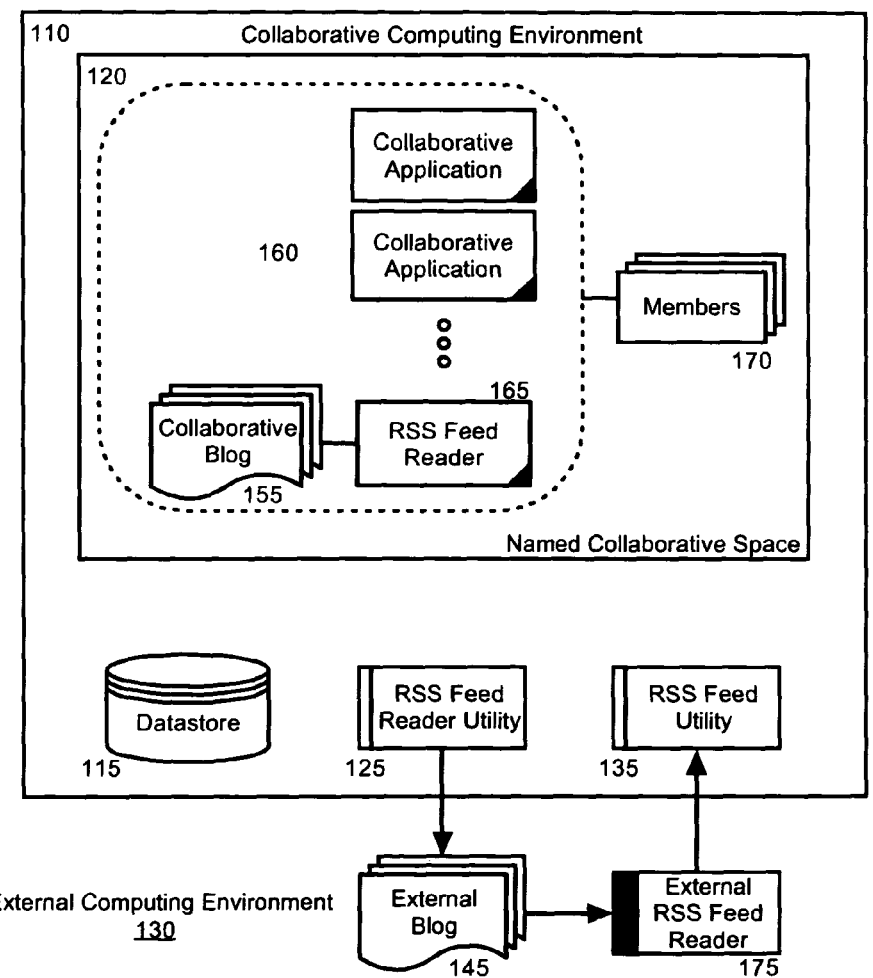
FIG. 1 is a schematic illustration of a collaborative system incorporating a blogging application in accordance with the present invention; and, FIG. 2 is a flow chart illustrating a process for integrating a blogging application in a collaborative space.

In more particular illustration, FIG. 1 is a schematic illustration of a collaborative system incorporating a blogging application in accordance with the present invention. The collaborative system can include a collaborative computing environment 110 hosting one or more named collaborative spaces 120. The named collaborative space 120 can be a dynamically customizable context having an arrangement of collaborators in a membership 170 defined to pursue a common objective through the use of the collaborative computing environment 110. The named collaborative space 120 further can include one or more logical components 160, referred to as collaborative tools or collaborative applications, and one or more resources for use by the collaborators of the membership 170 through the components 160 in the collaborative environment 110.

One of the collaborative tools can include a blog feed reader 165 (such as an RSS feed reader) configured to access a feed from one or more collaborative blogs 155 disposed within the collaborative environment 120 or access feeds external to the collaborative environment. The collaborative blogs 155 can be disposed within a data store 115 such that the content of the collaborative blogs 155 along with content from others of the components 160 can be accessed by other members 170 in other collaborative spaces in the collaborative computing environment 110.

Importantly, the members 170 in the named collaborative space 120 not only can access the internal collaborative blogs 155, but also the members 170 can access the content of one or more external blogs 145 in an external computing environment 130 through the operation of a feed utility 135 communicatively linked to an external feed reader 175. Also, postings formulated within the collaborative computing environment 110 can be provided to the external or internal readers 145 through the operation of a communicatively linked feed utility 125.

Figure 2:
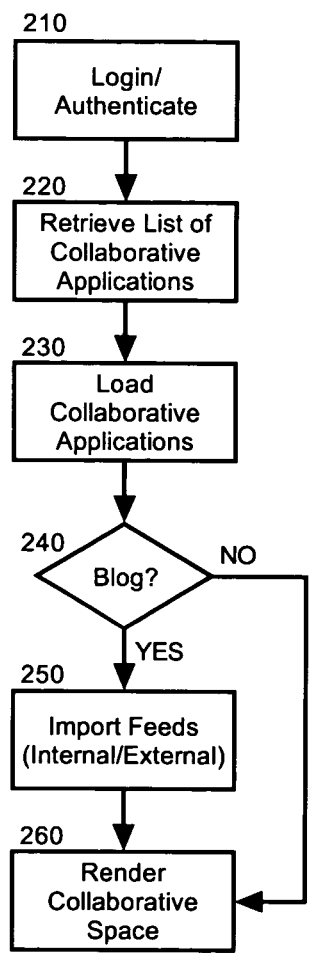

In further illustration, FIG. 2 is a flow chart illustrating the operation of the collaborative computing environment 110 through the integration of a blogging application. In block 210, a member of the collaborative environment can engage in a login and/or authentication process. Through the authentication process, a role can be associated with the member so as to place the member into a collaborative space and to regulate the member in interacting with the collaborative space. In block 220, a list of collaborative applications can be retrieved for the role assigned to the member and in block 230 the listed collaborative applications can be loaded into the collaborative space.

The list can include any number or type of collaborative applications and can include, by way of example, a shared document library, a discussion forum, a shared calendar and a persistent chat, to name a few. Notably, in decision block 240, it can be determined whether a blogging application is also to be loaded into the collaborative space. If so, in block 250 one or more feeds can be identified for the role assigned to the member and those feeds can be imported into the blogging application. Specifically, it can be determined whether a feed reader is to be loaded into the collaborative space, and the roles can determine what specific feeds can be read. Finally, in block 260 the collaborative space can be rendered for use by the member.

In general, the blogging application of the present invention can enjoy the following exemplary albeit non-exhaustive selection of characteristics:

1. Authors can add content with links in a post, edit posts, and create and maintain a blog roll of favorite blogs;

2. Readers can read blog posts, select links in the blog posts to other resources, obtain an address for a blog post for use as a reference in another blog, and post comments to the blog if enabled by the blog owner;

3. Posts can be sorted by date, by default, with the most recent post on top. Older posts can be 'archived'.

4. Blog contents can be a source for an RSS feed

When integrated into a collaborative space, the blogging application can enjoy yet further advantages not available in the ordinary stand-alone blogging environment:

1. Blogs can be protected by a single sign-on mechanism so that a member having read access who logs into a collaborative space can access not only collaborative components such as the document library, but also the blogs of the collaborative space.

2. The blogs can be searchable from the same user interface search element used to search across other components in the collaborative space so that the results of a search can be collected from any or all of the collaborative components in the collaborative space.

3. Blog posts can provide awareness of authors just as the other collaborative components can provide awareness of authors such as in the case of an instant messenger.

4. All members of collaborative space having write access can contribute in creating posts to the blogs. All members of the collaborative space having read access can read posts in the blogs. In this way, a single point of control can be applied to the membership.

5. The other collaborative components in the collaborative space can write to the blogs. For example, a post can be added to a blog indicating that a new document has been added to the document library, that a new topic has been added to the discussion forum, or that a meeting has been scheduled.

6. The deletion of the collaborative space can result in the deletion of the contained blogs such that the blog can be subject to the life cycle of the collaborative space just as other collaborative application are subject to the life cycle of the collaborative space.

7. Alerts of new postings in external blogs can be imported into the collaborative space through a standard web content syndication format such as RSS, and therefore can be searchable and readable with the user interface of the collaborative space.

8. New postings in the blogs of the collaborative space can be provided in a standard web content syndication format such as RSS to internal or external users.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for integrating a blogging application in a collaborative environment, the method comprising the steps of:
   processing a single sign-on for a member of the collaborative environment;
   associating a role with the member so as to place the member into a collaborative space in the collaborative environment and to regulate the member in interacting with the collaborative space;
   retrieving a list of collaborative applications for the role assigned to the member; and,
   loading the collaborative applications in the list into the collaborative space for use by the member from within the collaborative space, said collaborative applications including at least a blogging application.

2. The method of claim 1, further comprising the step of importing at least one blog feed reader into said blogging application.

3. The method of claim 2, wherein said importing step comprises the steps of importing content both from a feed which is internal to the collaborative environment, and also from a feed which is external to the collaborative environment.

4. The method of claim 1, further comprising the step of posting blog content through said blogging application from other ones of said collaborative components.

5. The method of claim 1, further comprising the step of performing a search for content across said collaborative components.

* * * * *